US008504566B2

(12) United States Patent
Plestid

(10) Patent No.: US 8,504,566 B2
(45) Date of Patent: Aug. 6, 2013

(54) METHOD OF PROVIDING A NUMBER OF SEARCH RESULTS FOR A HANDHELD ELECTRONIC DEVICE, AND SYSTEM AND HANDHELD ELECTRONIC DEVICE EMPLOYING THE SAME

(75) Inventor: Thomas Leonard Trevor Plestid, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 1114 days.

(21) Appl. No.: 11/934,251

(22) Filed: Nov. 2, 2007

(65) Prior Publication Data

US 2009/0119252 A1 May 7, 2009

(51) Int. Cl.
*G06F 17/30* (2006.01)
(52) U.S. Cl.
USPC .......................................... 707/736; 707/758
(58) Field of Classification Search
USPC ......................................... 707/759, 736, 758
See application file for complete search history.

(56) References Cited

U.S. PATENT DOCUMENTS

| | | | |
|---|---|---|---|
| 5,953,541 A | 9/1999 | King et al. | |
| 6,219,694 B1 | 4/2001 | Lazaridis et al. | |
| 6,452,588 B2 | 9/2002 | Griffin et al. | |
| 6,489,950 B1 | 12/2002 | Griffin et al. | |
| 7,711,781 B2* | 5/2010 | Davis et al. | 709/206 |
| 2002/0021311 A1* | 2/2002 | Shechter et al. | 345/864 |
| 2004/0165924 A1* | 8/2004 | Griffin | 400/486 |
| 2005/0223308 A1* | 10/2005 | Gunn et al. | 715/500 |
| 2005/0250547 A1* | 11/2005 | Salman et al. | 455/566 |
| 2006/0007120 A1 | 1/2006 | Fux et al. | |
| 2006/0007121 A1 | 1/2006 | Fux et al. | |
| 2006/0026335 A1* | 2/2006 | Hodgson et al. | 711/1 |
| 2007/0027848 A1 | 2/2007 | Howard et al. | |
| 2007/0060129 A1* | 3/2007 | Ramer et al. | 455/439 |
| 2007/0235535 A1* | 10/2007 | Davoust et al. | 235/386 |
| 2007/0281747 A1* | 12/2007 | Pletikosa et al. | 455/564 |
| 2008/0304892 A1* | 12/2008 | Baker | 400/486 |
| 2009/0058688 A1* | 3/2009 | Thorn | 341/22 |

FOREIGN PATENT DOCUMENTS

| | | |
|---|---|---|
| EP | 1 734 727 A1 | 12/2006 |
| EP | 1 775 655 A1 | 4/2007 |
| WO | WO 2007/005945 A2 | 1/2007 |

OTHER PUBLICATIONS

European Search Report in corresponding European Application No. 07119910.3 mailed by the European Patent Office in Mar. 17, 2008 (5 pages).
Communication in corresponding European Application No. 07119910.3 mailed by the European Patent Office on Dec. 2, 2008 (4 pages).
Office Action issued by the Canadian Intellectual Property Office on Jul. 10, 2012 in related Canadian Application No. 2,641,658.

* cited by examiner

*Primary Examiner* — Son T Hoang
(74) *Attorney, Agent, or Firm* — Finnegan, Henderson, Farabow, Garrett & Dunner, LLP

(57) ABSTRACT

A method provides search results for a handheld electronic device including an input apparatus having a plurality of input members, each of at least a portion of which have a plurality of characters assigned thereto. A type of the input apparatus is sent from the device to a server. The device receives a number of activations of a number of the input members, and sends the received number of activations to the server. The server determines a number of possible combinations of the characters based upon the received input apparatus type and the received number of activations, searches for a number of search results as a function of the number of possible combinations of the characters, and sends the number of search results to the device. The device receives the number of search results, and displays at least a portion of the number of search results.

19 Claims, 8 Drawing Sheets

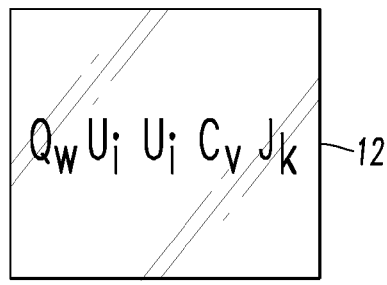
FIG. 7
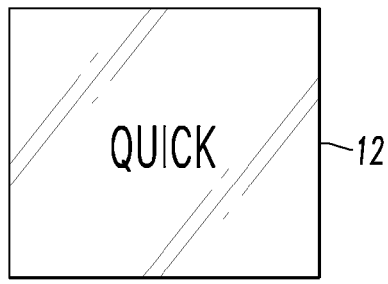
FIG. 8A
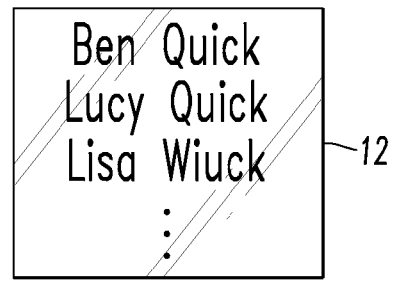
FIG. 8B
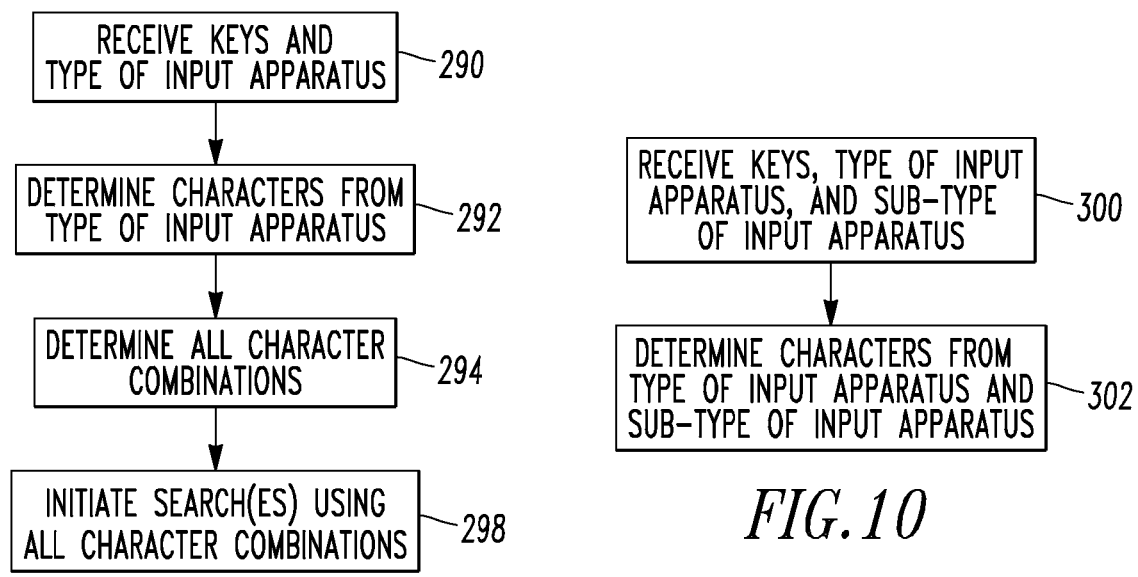
FIG. 9
FIG. 10

METHOD OF PROVIDING A NUMBER OF SEARCH RESULTS FOR A HANDHELD ELECTRONIC DEVICE, AND SYSTEM AND HANDHELD ELECTRONIC DEVICE EMPLOYING THE SAME

BACKGROUND

1. Field

The disclosed and claimed concept pertains generally to methods of providing search results and, more particularly, to methods of providing search results to a handheld electronic device from a server. The disclosed and claimed concept also pertains to systems including a server and a handheld electronic device. The disclosed and claimed concept further pertains to handheld electronic devices.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices. Wireless handheld electronic devices are generally intended to be portable, and thus are of a relatively compact configuration in which keys and other input structures often perform multiple functions under certain circumstances or may otherwise have multiple aspects or features assigned thereto. As a practical matter, the keys of a keypad can only be reduced to a certain small size before the keys become relatively unusable. In order to enable text entry, however, a keypad must be capable of entering all twenty-six letters of the Roman alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keypad by providing twelve keys, of which ten have digits thereon, and of these ten keys eight have Roman letters assigned thereto. For instance, one of the keys includes the digit "2" as well as the letters "A", "B", and "C". Other known reduced keyboards have included other arrangements of keys, letters, symbols, digits, and the like. Since a single actuation of such a key potentially could be intended by the user to refer to any of the letters "A", "B", and "C", and potentially could also be intended to refer to the digit "2", the input generally is an ambiguous input and is in need of some type of disambiguation or prediction in order to be useful for text entry purposes.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the digit "2" and the letters "ABC", if the user desires to specify the letter "C", then the user will press the key four times. While such multi-tap systems have been generally effective for their intended purposes, they nevertheless can require a relatively large number of key inputs compared with the number of characters that ultimately are output. Another example keystroke interpretation system is key chording (similar to musical multi-key chords), of which various types exist. For instance, a particular character can be entered by pressing two keys in succession or by pressing and holding a first key while pressing a second key. Still another keystroke interpretation system is a "press-and-hold/press-and-release" interpretation function in which a given key provides a first result if the key is pressed and immediately released, and provides a second result if the key is pressed and held for a short period of time.

Another keystroke interpretation system that has been employed is a software-based text disambiguation function. In such a system, a user typically presses keys to which one or more characters have been assigned, generally pressing each key one time for each desired letter, and the disambiguation software infers the intended input. Numerous different systems have been proposed. See, for example, U.S. Patent Application Publication Nos. 2006/0007120 and 2006/0007121; and U.S. Pat. No. 5,953,541. For example, as a user enters keystrokes, the device provides output in the form of a default output and a number of variants from which a user can choose. The output is based largely upon the previously recorded input frequency of the text, i.e., the likelihood that a user intended a particular output, but various features of the device provide additional variants that are not based solely on frequency and rather are provided by various logic structures resident on the device. The device enables editing during text entry and also provides a learning function that allows the disambiguation function to adapt to provide a customized experience for the user. Additionally, the device can facilitate the selection of variants by displaying a graphic of a special <NEXT> key of the keypad that enables a user to progressively select variants generally without changing the position of the user's hands on the device.

In an e-mail system, when performing a global address lookup (GAL) (over the air) (or "Lookup") through a remote server on a full QWERTY handheld electronic device, this GAL lookup maintains the same type of usability as a lookup that is performed locally on the device (i.e., search for contacts that are stored locally on the device). Specifically, if the user types "T P" in an address lookup, then all locally stored contacts that have search results (e.g., text matches) beginning with "T" or "P" are displayed. Some examples of local contacts that would be displayed are "Trevor Plestid, RIM", or "Pat Travino, Bell", or "<no name>, Trans Panama Airlines". If the user, instead, performs an over the air GAL lookup, then the search results are constrained to first name and last name in any order in known implementations.

On a handheld electronic device that provides, for example, SureType™ disambiguation (e.g., as disclosed by U.S. Patent Application Publication Nos. 2006/0007120 and 2006/0007121, which are incorporated by reference herein), the example rendered user interface (UT) output "T P" is provided by the device software when providing a local address lookup. For an over the air GAL lookup, if the user types "T/Y and O/P" on a SureType™ keyboard, and if the combination "T P" is rendered to the UT by the local device software, then the behavior is analogous to the above example of "T P" for local contacts, but the search results will yield any combination of "T/Y" and "O/P". That is to say, the device software is structured such that there is searching for the other possible combinations, such as "T O", "Y O" and "Y P" stored in local contacts, regardless that the UT output provided is shown as "T P". Hence, the user may see additional search results. While the device software selects the specific characters to render to the display, the device local contact search results that are brought up will display all possible combinations regardless of the actual letters that the device software rendered.

There is room for improvement in methods of providing search results to a handheld electronic device from a server.

There is also room for improvement in systems including a server and a handheld electronic device.

There is further room for improvement in handheld electronic devices.

BRIEF DESCRIPTION OF THE DRAWINGS

A full understanding of the disclosed and claimed concept can be gained from the following description of the preferred embodiments when read in conjunction with the accompanying drawings in which:

FIGS. 7, 8A and 8B are display screens of the wireless handheld electronic device of FIG. 1 in accordance with another embodiment of the disclosed and claimed concept.

FIGS. 9-12 are flowcharts of routines of the server of FIG. 2 in accordance with other embodiments of the disclosed and claimed concept.

DESCRIPTION

Figure 1:
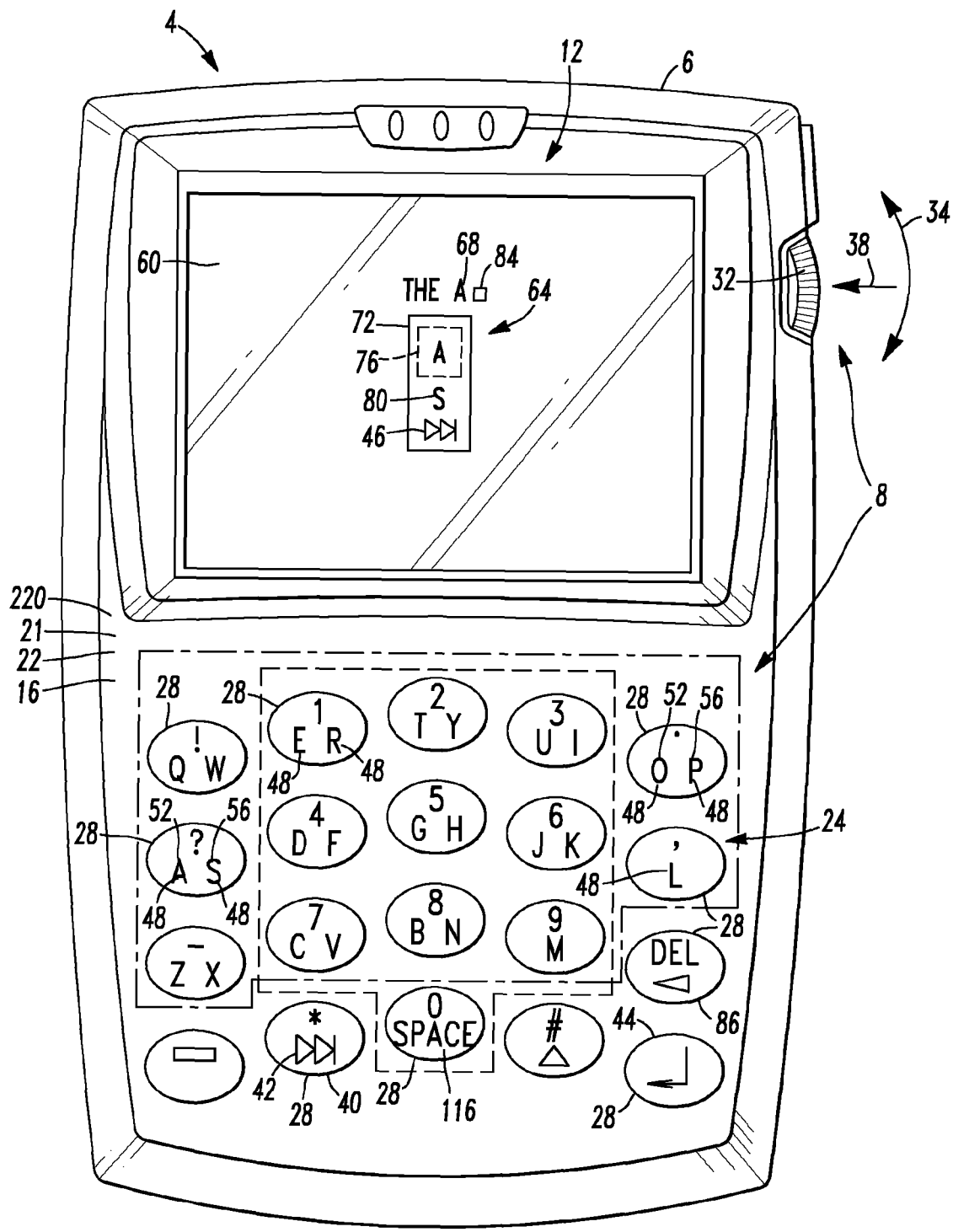
FIG. 1 is a top plan view of a wireless handheld electronic device in accordance with embodiments of the disclosed and claimed concept.

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

Embodiments of the disclosed and claimed concept determine, at a server, a number of possible combinations of characters based upon an input apparatus type and a number of activations of a number of input members of a handheld electronic device, and search for a number of search results as a function of the number of possible combinations of the characters.

In accordance with one aspect of the disclosed and claimed concept, a method provides a number of search results for a handheld electronic device, the handheld electronic device including an input apparatus having an input apparatus type, the input apparatus including a plurality of input members, each of at least a portion of the input members having a plurality of characters assigned thereto, the method comprising: sending the input apparatus type from the handheld electronic device to a server; receiving a number of activations of a number of the input members of the input apparatus at the handheld electronic device; sending the received number of activations from the handheld electronic device to the server; receiving the input apparatus type at the server; receiving the number of activations at the server; determining at the server a number of possible combinations of the characters based upon the received input apparatus type and the received number of activations; searching for a number of search results as a function of the number of possible combinations of the characters; sending the number of search results from the server to the handheld electronic device; receiving the number of search results at the handheld electronic device; and displaying at least a portion of the number of search results at the handheld electronic device.

The method may further comprise performing a disambiguation at the server of the number of possible combinations of the characters to provide a rendered output; and employing the rendered output as the function of the number of possible combinations of the characters.

The method may further comprise rendering disambiguation results from a disambiguation algorithm at the handheld electronic device; performing the disambiguation at the server independent of the disambiguation algorithm of the handheld electronic device; and sending the rendered disambiguation results to the server.

The method may further comprise sending a unique identification of the handheld electronic device to the server; receiving the unique identification at the server; and performing the disambiguation at the server as a function of the unique identification.

The method may further comprise employing a disambiguation algorithm including a disambiguation type at the handheld electronic device; sending the disambiguation type of the handheld electronic device from the handheld electronic device to the server; receiving the disambiguation type of the handheld electronic device at the server; and performing the disambiguation at the server of the number of possible combinations of the characters as a function of the received disambiguation type of the handheld electronic device, in order that the disambiguation at the server is the same as or substantially similar to the disambiguation algorithm of the handheld electronic device.

The method may further comprise employing as the input apparatus a keyboard having a sub-type; modifying the keyboard to provide a different sub-type; sending the different sub-type from the handheld electronic device to the server; receiving the different keyboard sub-type at the server; and determining at the server the number of possible combinations of the characters based upon the received input apparatus type, the received different keyboard sub-type and the received number of activations.

The method may further comprise employing as the function of the number of possible combinations of the characters all possible combinations of the characters.

As another aspect of the disclosed and claimed concept, a system comprises: a handheld electronic device comprising: a processor, a wireless transceiver, a display apparatus, and an input apparatus including an input apparatus type and a plurality of input members, each of at least a portion of the input members having a plurality of characters assigned thereto; a server comprising a processor; and a wireless communication network between the wireless transceiver of the handheld electronic device and the processor of the server, wherein the processor of the handheld electronic device is structured to send the input apparatus type to the server, receive a number of activations of a number of the input members of the input apparatus, and send the received number of activations to the server, wherein the processor of the server is structured to receive the input apparatus type, receive the number of activations, determine a number of possible combinations of the characters based upon the received input apparatus type and the received number of activations, search for a number of search results as a function of the number of possible combinations of the characters, and send the number of search results to the handheld electronic device, and wherein the processor of the handheld electronic device is further structured to receive the number of search results, and display at least a portion of the number of search results at the display apparatus.

As another aspect of the disclosed and claimed concept, a handheld electronic device is for use with a server structured to receive an input apparatus type, receive a number of activations of a number of input members, determine a number of possible combinations of characters based upon the received input apparatus type and the received number of activations, search for a number of search results as a function of a number of possible combinations of characters, and send the number of search results to the handheld electronic device, the handheld electronic device comprises: a wireless transceiver; a display apparatus; an input apparatus including the input apparatus type and a plurality of the input members, each of at least a portion of the input members having a plurality of the characters assigned thereto; and a processor structured to send the input apparatus type from the handheld electronic device to the server, receive a number of activations of a number of the input members of the input apparatus, send the received number of activations to the server, receive the number of search results, and display at least a portion of the number of search results at the display apparatus.

The input apparatus may be a keyboard having a sub-type, the keyboard being structured to be modified to provide a different sub-type; and the processor may be further structured to send the different sub-type to the server, in order that the server receives the different sub-type and determines the number of possible combinations of the characters based upon the received input apparatus type, the received different sub-type and the received number of activations.

The disclosed and claimed concept is described in association with a global address lookup provided by a message server for a wireless handheld electronic device, although the disclosed and claimed concept is applicable to servers, which provide a wide range of search results.

Figure 1A:
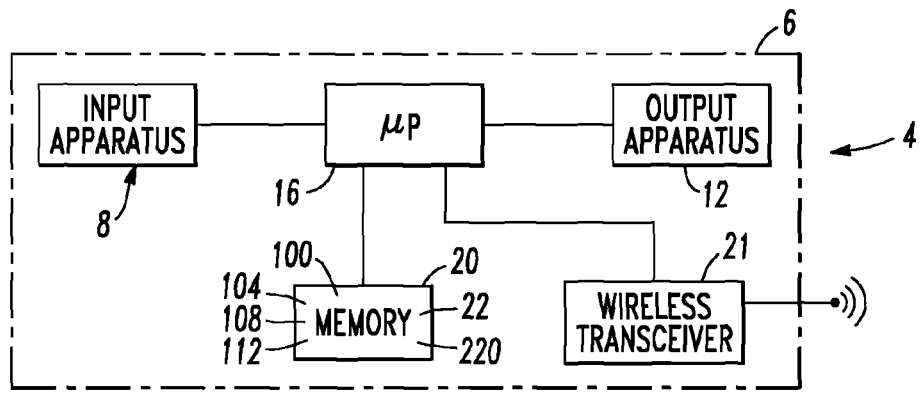
FIG. 1A is a block diagram in schematic form of the wireless handheld electronic device of FIG. 1.

An improved handheld electronic device 4 is indicated generally in FIG. 1 and is depicted schematically in FIG. 1A. The example handheld electronic device 4 includes a housing 6 upon which are disposed a processor unit that includes an input apparatus 8, an output apparatus 12, a processor 16, a memory 20, a wireless transceiver 21, and a number of routines. The processor 16 may be, for instance, and without limitation, a microprocessor (μP), which responds to inputs from the input apparatus 8 and provides output signals to the output apparatus 12. The processor 16 also interfaces with the memory 20 and the wireless transceiver 21. Examples of handheld electronic devices are included in U.S. Pat. Nos. 6,452,588 and 6,489,950, which are incorporated by reference herein.

As can be understood from FIG. 1, the example input apparatus 8 includes a keypad 24 and a thumbwheel 32. Alternatively, a trackball (not shown), a touchscreen (not shown), or other suitable cursor positioning device may be employed. As will be described in greater detail below, the keypad 24 is in the example form of a reduced QWERTY keyboard including a plurality of keys 28 that serve as input members. The input apparatus 8 includes an input apparatus type (as will be discussed below in greater detail in connection with FIGS. 3-6) and a plurality of input members, such as the example keys 28. As shown in FIG. 1, each of at least a portion of the keys 28 have a plurality of characters assigned thereto. It is noted, however, that the keypad 24 may be of other configurations, such as an AZERTY keyboard, a QWERTZ keyboard, or other reduced keyboard arrangement, whether presently known or unknown. In this regard, the expression "reduced" and variations thereof, in the context of a keyboard, a keypad, or other arrangement of input members, shall refer broadly to an arrangement in which at least one of the input members has assigned thereto a plurality of characters within a given set, such as a plurality of letters, for example, in the set of Roman letters, for example, thereby rendering ambiguous an intended result of an actuation of the at least one of the input members.

As will be set forth below in greater detail, the system architecture of the example handheld electronic device 4 advantageously is organized to be operable independent of the specific layout of the keypad 24. Accordingly, the system architecture of the handheld electronic device 4 can be employed in conjunction with virtually any keypad layout substantially without requiring any meaningful change in the system architecture.

The keys 28 are disposed on a front face of the housing 6, and the thumbwheel 32 is disposed at a side of the housing 6. The thumbwheel 32 can serve as another input member and is both rotatable, as is indicated by the arrow 34, to provide selection inputs to the processor 16, and also can be pressed in a direction generally toward the housing 6, as is indicated by the arrow 38, to provide another selection input to the processor 16.

Among the keys 28 of the keypad 24 are a <NEXT> key 40 and an <ENTER> key 44. The <NEXT> key 40 can be pressed to provide a selection input to the processor 16 and provides substantially the same selection input as is provided by a rotational input of the thumbwheel 32. Since the <NEXT> key 40 is provided adjacent a number of the other keys 28 of the keypad 24, the user can provide a selection input to the processor 16 substantially without moving the user's hands away from the keypad 24 during a text entry operation. As will be described in greater detail below, the <NEXT> key 40 additionally and advantageously includes a graphic 42 disposed thereon, and in certain circumstances the output apparatus 12 also displays a displayed graphic 46 thereon to identify the <NEXT> key 40 as being able to provide a selection input to the processor 16. In this regard, the displayed graphic 46 of the output apparatus 12 is substantially similar to the graphic 42 on the <NEXT> key and thus identifies the <NEXT> key 40 as being capable of providing a desirable selection input to the processor 16.

As can further be seen in FIG. 1, many of the keys 28 include a number of characters 48 disposed thereon. In the example depiction of the keypad 24, many of the keys 28 include two characters, such as including a first character 52 and a second character 56 assigned thereto. It is understood that the expression "characters" shall broadly be construed to include letters, digits, symbols and the like and can additionally include ideographic characters, components thereof, and the like.

One of the keys 28 of the keypad 24 includes as the characters 48 thereof the letters "Q" and "W", and an adjacent key 28 includes as the characters 48 thereof the letters "E" and "R". It can be seen that the arrangement of the characters 48 on the keys 28 of the keypad 24 is generally of a QWERTY arrangement, albeit with many of the keys 28 including two of the characters 28.

The output apparatus 12 includes a display 60 upon which can be provided an example output 64. The output 64 includes a text component 68 and a variant component 72. The variant component 72 includes a default portion 76 and a variant portion 80. The display also includes a caret 84 (or cursor) that depicts generally where the next input from the input apparatus 8 will be received.

The text component 68 of the output 64 provides a depiction of the default portion 76 of the output 64 at a location on the display 60 where the text is being input. The variant component 72 is disposed generally in the vicinity of the text component 68 and provides, in addition to the default proposed output 76, a depiction of the various alternate text choices, i.e., alternates to the default proposed output 76, that are proposed by an input disambiguation function in response to an input sequence of key actuations of the keys 28.

As will be described in greater detail below, the default portion 76 is proposed by the disambiguation function as being the most likely disambiguated interpretation of the ambiguous input provided by the user. The variant portion 80 includes a predetermined quantity of alternate proposed interpretations of the same ambiguous input from which the user can select, if desired. The displayed graphic 46 typically is provided in the variant component 72 in the vicinity of the variant portion 80, although it is understood that the displayed graphic 46 could be provided in other locations and in other fashions. It is also noted that the example variant portion 80 is depicted herein as extending vertically below the default portion 76, but it is understood that numerous other arrangements could be provided.

Among the keys 28 of the keypad 24 additionally is a <DELETE> key 86 that can be provided to delete a text entry. The <DELETE> key 86 can also be employed in providing an alternation input to the processor 16 for use by the disambiguation function.

Figure 1B:
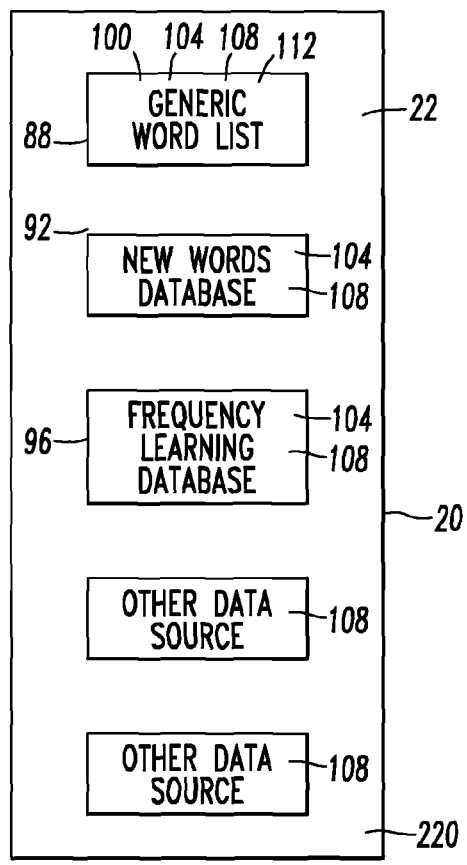
FIG. 1B is a block diagram in schematic form of the memory of the wireless handheld electronic device of FIG. 1A.

The memory 20 is depicted schematically in FIG. 1B. The memory 20 can be any of a variety of types of internal and/or external storage media such as, without limitation, RAM, ROM, EPROM(s), EEPROM(s), and the like that provide a storage register for data storage such as in the fashion of an internal storage area of a processor, and can be volatile memory or nonvolatile memory. The memory 20 additionally includes a number of routines depicted generally with the numeral 22 for the processing of data. The routines 22 can be in any of a variety of forms such as, without limitation, software, firmware, and the like. As will be explained in greater detail below, the routines 22 include the aforementioned disambiguation function as an application, as well as other routines.

As can be understood from FIG. 1B, the memory 20 additionally includes data stored and/or organized in a number of tables, sets, lists, and/or otherwise. Specifically, the memory 20 includes a generic word list 88, a new words database 92, and a frequency learning database 96. Stored within the various areas of the memory 20 are a number of language objects 100 and frequency objects 104. The language objects 100 generally are each associated with an associated frequency object 104. The language objects 100 include a plurality of word objects 108 and a plurality of N-gram objects 112. The word objects 108 are generally representative of complete words within the language or custom words stored in the memory 22. For instance, if the language stored in the memory is, for example, English, generally each word object 108 would represent a word in the English language or would represent a custom word.

Figure 2:
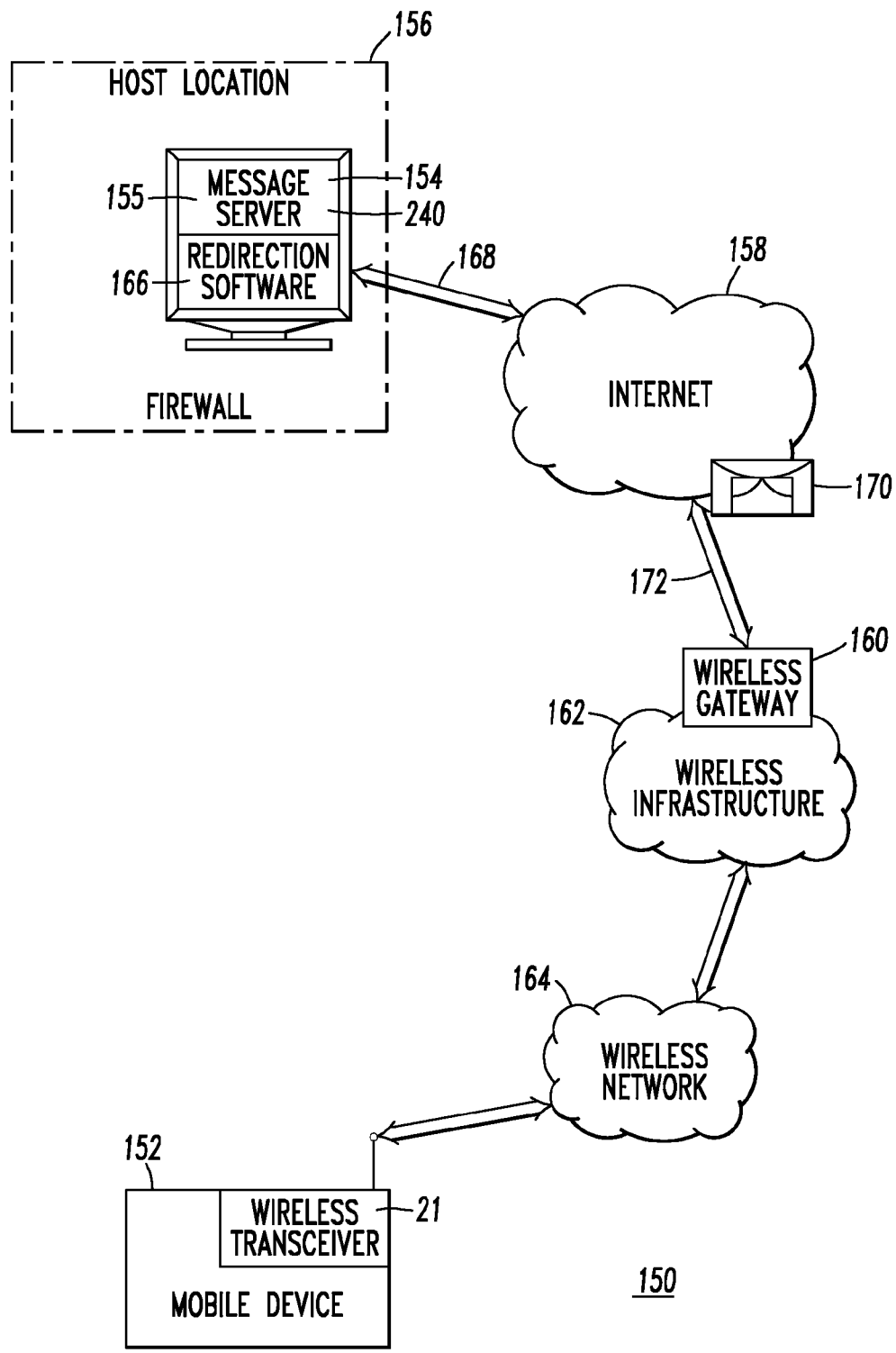
FIG. 2 is block diagram of a system including a wireless handheld electronic device, a wireless communication network and a server in accordance with other embodiments of the disclosed and claimed concept.

FIG. 2 is an overview of an example communication system 150 in which a wireless handheld electronic device 152 may be used. The device 152 may be the same as or similar to the device 4 of FIG. 1. One skilled in the art will appreciate that there may be hundreds of different possible topologies, but the system 150 shown in FIG. 2 shows one possible topology for communication between the device 152 and a server 154 having a processor 155. There may also be many message senders (not shown) and recipients (not shown) other than the device 152. The simple system 150 shown in FIG. 2 is for illustrative purposes only, and shows an Internet e-mail environment where security is not generally used.

The system 150 includes a host system 156 having the server 154, the Internet 158, a wireless gateway 160, wireless infrastructure 162, a wireless network 164, and a number of message senders and recipients, such as the device 152. The system 150 provides a wireless communication network between the wireless transceiver 21 of the device 152 and the server processor 155.

In this example, the server 154 includes redirection software 166, although there is no requirement that it must reside on such server. For example and without limitation, other topologies may employ that software in the wireless gateway 160. The central host system 156 can be, for example, a corporate office or other LAN, but may instead be a home office computer or some other private system where mail messages are being exchanged. Within the host system 156 is the message server 154, running within the firewall of the host system, that acts as the main interface for the host system to exchange e-mail with the Internet 158. The redirection software 166 enables redirection of data items from the server 154 to the device 152. The redirection software 166 and the message server 154 co-operate and interact to allow the pushing of information to mobile devices, such as 152. In this installation, the redirection software 166 takes confidential and non-confidential corporate information for a specific user and redirects it out through the corporate firewall to such mobile devices, such as 152. A more detailed description of the redirection software 166 is found in U.S. Pat. No. 6,219,694, which is incorporated by reference herein. This push technique may use a wireless friendly encoding, compression and encryption technique to deliver all information to a mobile device, thus effectively extending the security firewall to include each mobile device, such as 152, associated with the host system 156.

The server 154 employs, for example, a link 168 to the Internet 158 as its connection mechanism. The wireless gateway 160 employs, for example, a link 172 to the Internet 158 as its connection mechanism.

The message server 154 may be implemented, for example, on a network computer within the firewall of a corporation, a computer within an ISP or ASP system or the like, and acts as the main interface for e-mail exchange over the Internet 158. Although other messaging systems might not require a message server 154, a mobile device, such as 152, configured for receiving and possibly sending e-mail will normally be associated with an account on a message server. Perhaps the two most common message servers are Microsoft Exchange™ and Lotus Domino™. These products are often used in conjunction with Internet mail routers (not shown) that route and deliver mail.

The wireless gateway 160 and infrastructure 162 provide a link between the Internet 158 and wireless network 164. The wireless infrastructure 162 determines the most likely network for locating a given user and tracks the user when roaming between countries or networks. A message is then delivered to the mobile device 152 via wireless transmission, typically at a radio frequency (RF), from a base station (not shown) in the wireless network 164 to the mobile device 152. The particular wireless network 164 may be virtually any wireless network over which messages may be exchanged with a mobile communication device.

In the example automatic redirection system of FIG. 2, a composed e-mail message (not shown) leaving an e-mail sender (not shown) arrives at the message server 154 and is redirected by the redirection software 166 to the mobile device 152. As this redirection takes place, the message is re-enveloped, as indicated at 170, and a possibly proprietary compression and encryption algorithm can then be applied to the original message. In this way, messages being read on the mobile device 152 are no less secure than if they were read on a desktop workstation (not shown) within the firewall. All messages exchanged between the redirection software 166 and the mobile device 152 preferably use this message repackaging technique. Another goal of this outer envelope 170 is to maintain the addressing information of the original message except the sender's and the receiver's address. This allows reply messages to reach the appropriate destination, and also allows the "from" field to reflect the mobile user's desktop address. Using the user's e-mail address from the mobile device 152 allows the received message to appear as though the message originated from the user's desktop system (not shown) rather than the mobile device 152.

Regardless of the specific mechanism controlling the forwarding of messages to the mobile device 152, a message, or possibly a translated or reformatted version thereof, such as 170, is sent to the wireless gateway 160. The wireless infrastructure 162 includes a series of connections to the wireless network 164. These connections could be, for example and without limitation, Integrated Services Digital Network (ISDN), Frame Relay or T1 connections using the TCP/IP protocol used throughout the Internet 158. As used herein, the term "wireless network" is intended to include three different types of networks, those being: (1) data-centric wireless networks; (2) voice-centric wireless networks; and (3) dual-mode networks that can support both voice and data communications over the same physical base stations. Combined dual-mode networks include, but are not limited to: (1) Code Division Multiple Access (CDMA) networks; (2) the Groupe Special Mobile or the Global System for Mobile Communications (GSM) and the General Packet Radio Service (GPRS) networks; and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

As will be discussed, below, in greater detail in connection with FIGS. 3-5, the device 152 is structured to receive a number of activations of a number of input members (such as the keys 28 of FIG. 1), and send its input apparatus type and the received number of activations to the server 154. The server 154 is structured to receive the input apparatus type and the number of activations from the device 152, determine a number of possible combinations of characters based upon the received input apparatus type and the received number of activations, search for a number of search results as a function of the number of possible combinations of characters, and send the number of search results to the device 152. The device 152, in turn, receives the number of search results, and displays at least a portion of the number of search results at its output apparatus 12, such as the display 60.

Figure 3:
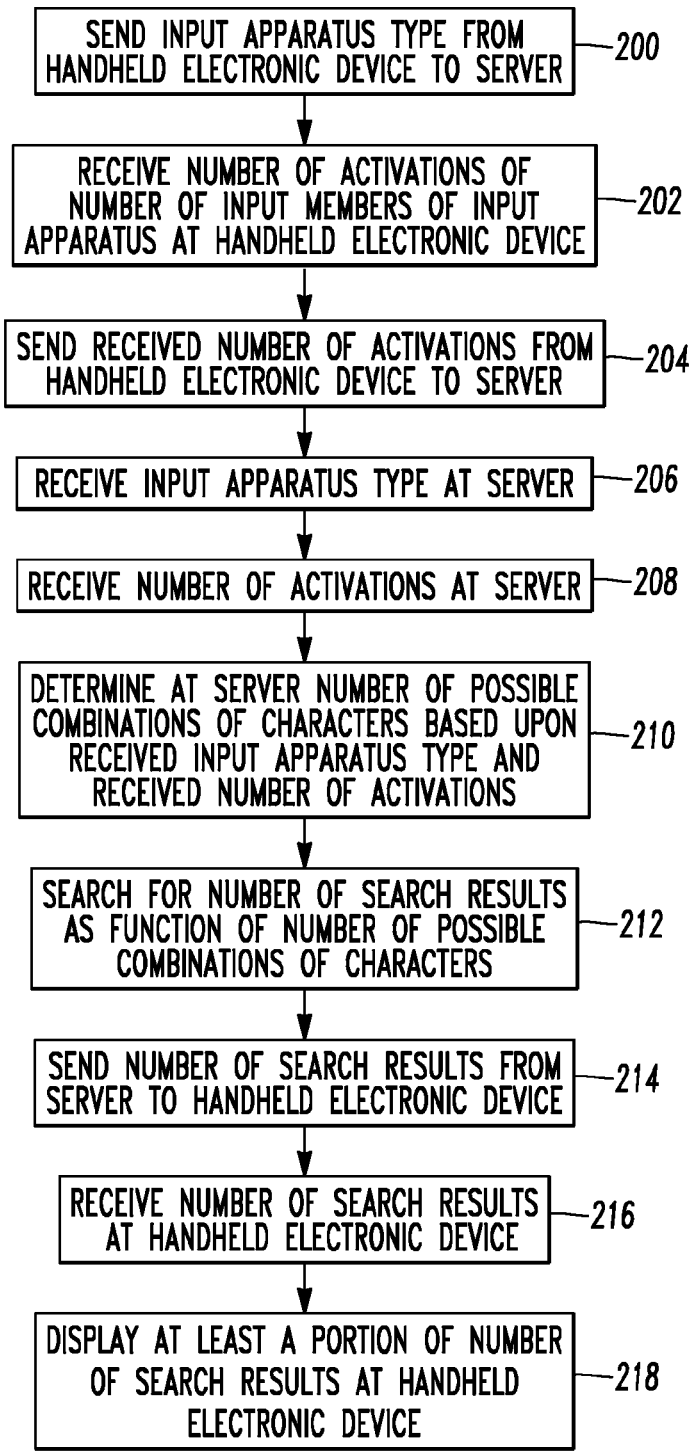
FIG. 3 is a diagram of a process providing a number of search results for a handheld electronic device from a server in accordance with other embodiments of the disclosed and claimed concept.

FIG. 3 shows a process providing a number of search results for a handheld electronic device (e.g., without limitation, the device 4 of FIG. 1; the device 152 of FIG. 2) from a server (e.g., without limitation, the server 154 of FIG. 2). For example, the input apparatus 8 of FIG. 1A has an input apparatus type (e.g., without limitation, a corresponding keyboard layout type, such as the reduced "QWERTY" keyboard layout of the example device 4 of FIG. 1) and plurality of input members (e.g., without limitation, keys 28 of FIG. 1). As was discussed above in connection with FIG. 1, each of at least a portion of the keys 28 has a plurality of characters assigned thereto. This process includes, at 200, sending the input apparatus type from the handheld electronic device to the server; receiving, at 202, a number of activations of a number of the input members of the input apparatus at the handheld electronic device; sending, at 204, the received number of activations from the handheld electronic device to the server; receiving, at 206, the input apparatus type at the server; receiving, at 208, the number of activations at the server; determining at the server, at 210, a number of possible combinations of the characters based upon the received input apparatus type and the received number of activations; searching, at 212, for a number of search results as a function of the number of possible combinations of the characters; sending, at 214, the number of search results from the server to the handheld electronic device; receiving, at 216, the number of search results at the handheld electronic device; and displaying, at 218, at least a portion of the number of search results at the handheld electronic device.

Figure 4:
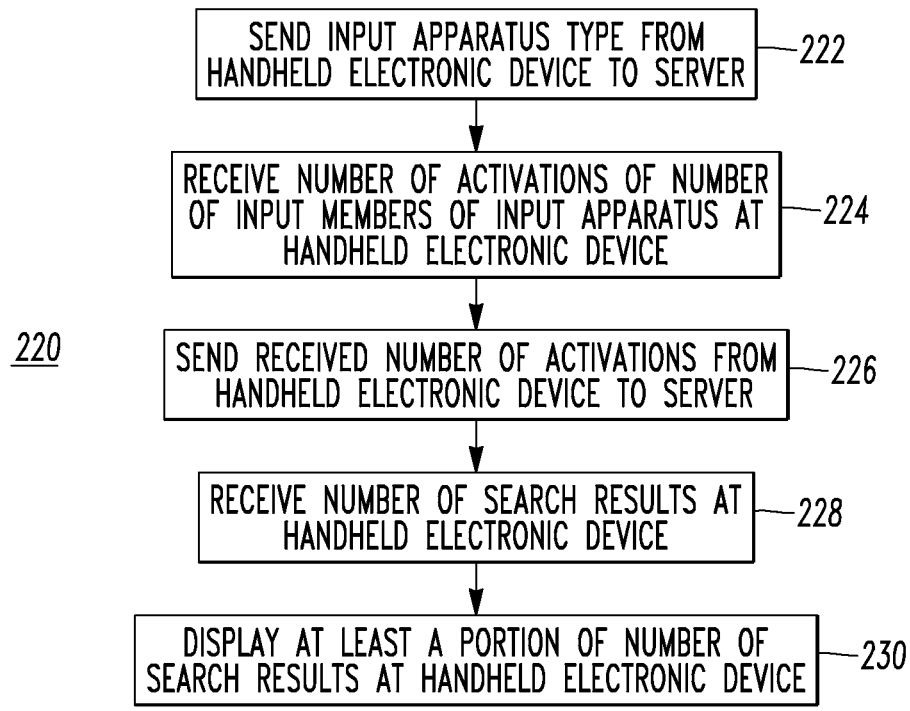
FIG. 4 is a flowchart of a routine of the wireless handheld electronic device of FIG. 1 in accordance with another embodiment of the disclosed and claimed concept.

Referring to FIG. 4, a routine 220 of the wireless handheld electronic device 4 of FIG. 1 is shown. First, at 222, the input apparatus type is sent from the handheld electronic device 4 to the server (e.g., without limitation, the server 154 of FIG. 2). Next, at 224, a number of activations of a number of the keys 28 of the input apparatus 8 are received at the handheld electronic device 4. Although not required, at this point, the device 4 may optionally perform disambiguation, even though no search results need be returned. Then, at 226, the received number of activations are sent from the handheld electronic device 4 to the server 154. Next, at 228, a number of search results are received from the server 154 at the handheld electronic device 4. Finally, at 230, at least a portion of the number of search results are displayed on the output apparatus 12 of the handheld electronic device 4.

Figure 5:
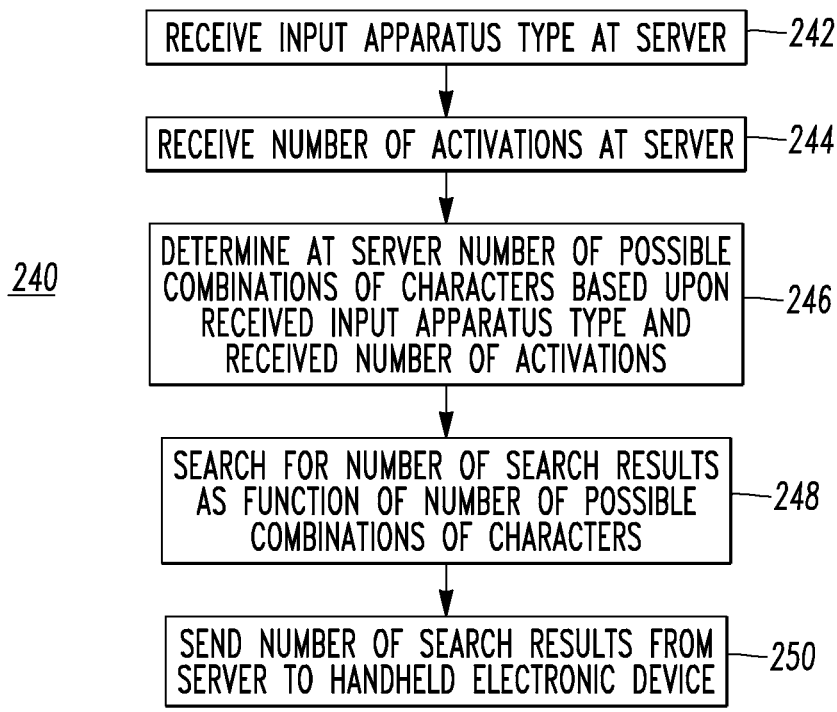
FIG. 5 is a flowchart of a routine of the server of FIG. 2 in accordance with another embodiment of the disclosed and claimed concept.

FIG. 5 shows a routine 240 of the server 154 of FIG. 2. First, at 242, the input apparatus type is received from the handheld electronic device (e.g., 152 of FIG. 2) at the server 154. Next, at 244, the number of activations are received at the server 154. Then, at 246, the server 154 determines the number of possible combinations of characters based upon the received input apparatus type and the received number of activations. Next, at 248, the server 154 searches for a number of search results as function of the number of possible combinations of characters. Finally, at 250, the number of search results are sent from the server 154 to the handheld electronic device 4.

Figure 6:
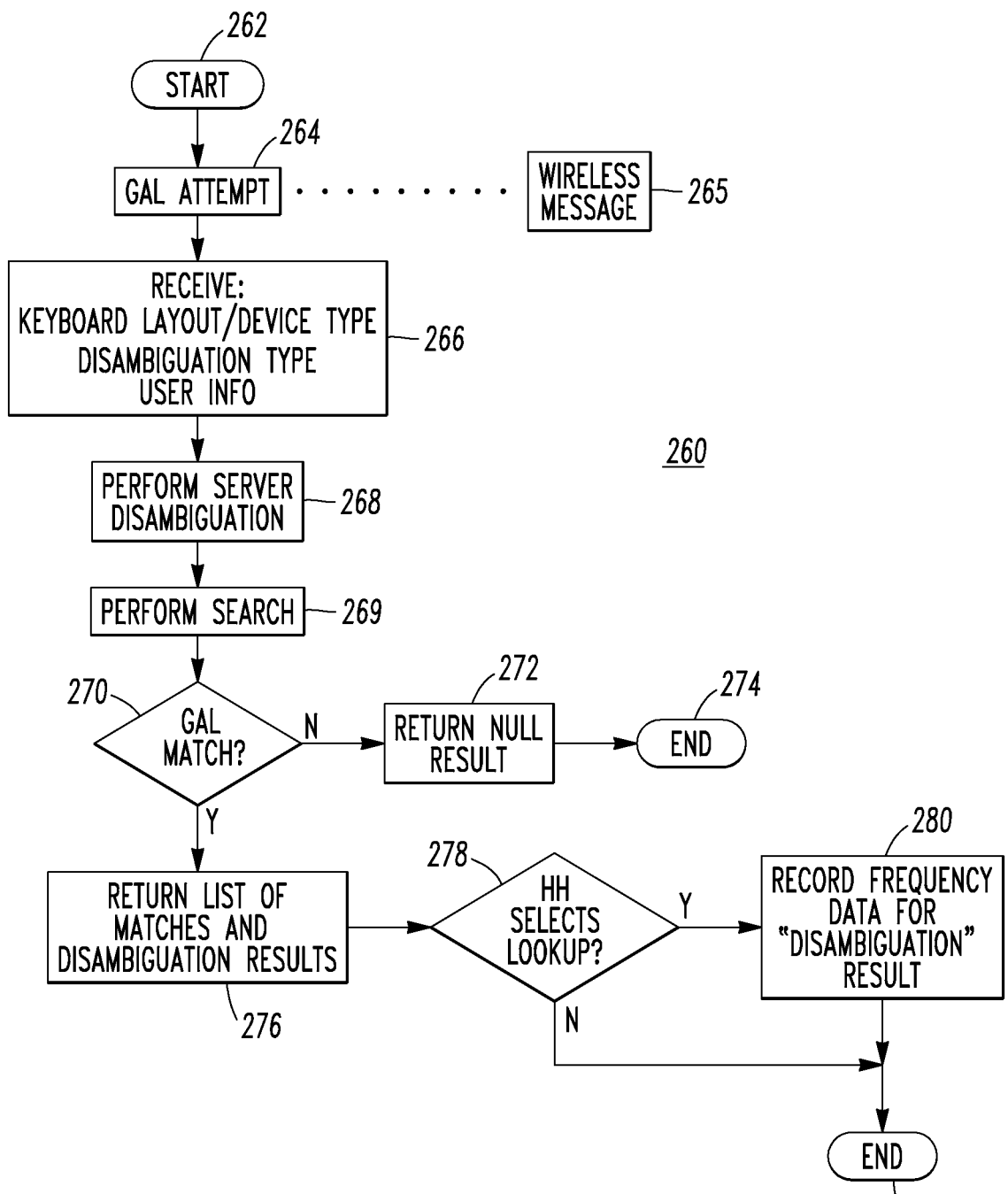
FIG. 6 is a flowchart of another routine of the server of FIG. 2, which routine uses knowledge of the keypad or text entry configuration of a wireless handheld electronic device to perform disambiguation for a global address lookup function, in accordance with another embodiment of the disclosed and claimed concept.

Referring to FIG. 6, another example routine 260 of the server 154 of FIG. 2 is shown. This routine 260 uses knowledge of the keypad or other text entry configuration of a wireless handheld electronic device (e.g., 4 of FIG. 1; 152 of FIG. 2) to perform disambiguation for a global address lookup (GAL) function. After starting, at 262, the routine 260 undertakes a GAL attempt, for example, in response to receiving a corresponding wireless message 265 from the wireless handheld electronic device. Alternatively, this could be a simple lookup, which is not associated with the receipt of an e-mail message. This example wireless message 265 includes a number of activations of a number of the input members of the input apparatus of the handheld electronic device. Next, at 266, the routine 260 receives an input apparatus type, such as a keyboard layout/device type (e.g., without limitation, SureType™; QWERTY; keypad; slider), a disambiguation type (e.g., without limitation, SureType™; T9; predictive text), and, optionally, a unique identification of the handheld electronic device, such as user information (user info). Next, at 268, the routine 260 performs a disambiguation to provided a rendered output based upon the received disambiguation type, the received number of activations of a number of the input members of the handheld electronic device input apparatus, the received input apparatus type, and, optionally, the unique identification of the handheld electronic device. This step will be further explained by Examples 1-3, 5 and 8, below. The unique identification is only employed if the server 154 "learns" a disambiguation history on a per user basis, as opposed to learning a disambiguation history on a global basis for all users (i.e., clients of the server).

Then, at 269, the routine 260 performs a GAL search using the rendered output of step 268. Next, at 270, it is determined if there were any GAL matches from the search at 269. If not, then at 272, a null result is returned to the handheld electronic device, after which the routine 260 ends at 274. On the other hand, if there were a number of GAL matches from the search at 269, then, at 276, a list of matches and, optionally, the disambiguation results are sent to the handheld electronic device. This permits the handheld electronic device to display, in addition to the list of GAL matches (FIG. 8B; FIG. 13B), any of: (1) disambiguation results provided by the handheld electronic device (FIG. 8A); (2) disambiguation results provided by the routine 260; (3) no disambiguation results (FIG. 13A); or (4) a representation of the number of activations of a number of the input members (FIG. 7).

Next, at 278, it is determined if the handheld electronic device selects lookup. A list of fully qualified e-mail addresses is presented at 276 based on the server side disambiguation of the handheld electronic device's input. As a continuation of this transaction, when the handheld electronic device selects an e-mail address, the server is also aware of this selection at the time the e-mail message is sent. If the test passes at 278, then at 280, the frequency data is recorded for the disambiguation result. This frequency is determined at the server as part of the entire transaction of the routine 260, since when the e-mail message is sent, the user selection and usage of the GAL matches in the disambiguation is seen in the message composition. Otherwise, if the test fails at 278, or after 280, the routine 260 ends at 282.

Example 1

As one non-limiting example of steps 264, 266, 268, the user wishes to do an over the air GAL lookup of a person named "Yolanda Openheimer" and types three keys "T/Y", "SPACE" 116 (FIG. 1) and "O/P" before selecting "Lookup:_" at the handheld electronic device. At 264, the wireless message 265 from the handheld electronic device to the server 154 includes, in this example, three activations of three different input members (e.g., "T/Y", "SPACE" and "O/P", which might be represented at the handheld electronic device, for example and without limitation, by key numbers, such as key #3, key #18 and key #5) of the input apparatus 8 of the handheld electronic device. At 266, the routine 260 receives the input apparatus type, such as the SureType™ keyboard layout/device type, the SureType™ disambiguation type, but no unique identification of the handheld electronic device. This permits the server 154 to determine that the user typed the keys "T/Y", "SPACE" and "O/P" of the SureType™ keyboard layout and that the handheld electronic device employs SureType™ disambiguation on a global (as opposed to a per user) basis. Finally, step 268 performs the disambiguation to provide the rendered output of, for example and without limitation, "Y O". From this result, the search of 269 returns a list of GAL matches, which may include, for example and without limitation, "Yolanda Openheimer" and "Ollie Young". This permits the server 154 to perform a disambiguation of the number of possible combinations of the characters ("T/Y", "SPACE" and "O/P") to provide a rendered output back to the handheld electronic device at 276, and to employ the rendered output as a function of the number of possible combinations of those characters.

In this example, it will be appreciated that the disambiguation on a global basis might have, instead, provided another rendered output, such as one of "Y P", "T O" and "T P". Again, by way of example, if the user wishes to do an over the air GAL lookup of a person named "Yolanda Openheimer", then the user types "T/Y O/P", but as above, if the rendered output is the characters "T P", then the GAL lookup, in turn, will only show search results to these explicit characters "T P" rather than the desired characters "Y O". That is to say, the remote server GAL lookup is dependent on the handheld electronic device rendering of the input. Here, step 266 may optionally receive the rendered handheld electronic device disambiguated output.

In this example, the rendered output has a count (e.g., 3) of characters that is equal to the count (e.g., 3) of activations of the number of the input members of the ambiguous input. It will be appreciated, however, that the rendered output may alternatively have a count of characters that is substantially equal to the count of activations of the number of the input members of the ambiguous input. For example, the user intends to type "cannot" and "can't" is rendered.

The server routine 260 that is providing the data in the over the air GAL lookup maintains knowledge of the keyboard layout/device type (and, thus, the various possible keyboard configurations). In this way, where any kind of disambiguation software (e.g., without limitation, SureType™; T9; predictive text) is used on a particular handheld electronic device (e.g., handset), then the routine 260 performs pattern matching based on the corresponding keyboard or text entry configurations.

For the example SureType™ disambiguation on a global (as opposed to a per user) basis, the server 154 performs the corresponding disambiguation algorithm using frequencies of terms for all users. This learning function is global to all users, as opposed to being local to individual users. The manifestation is that the terms that are learned are presented to the user as potential GAL search results.

Example 2

FIG. 7 shows a pertinent portion (e.g., without limitation, entry field) of the output apparatus 12 of the wireless handheld electronic device 4 of FIG. 1 after the user has typed five activations of four different input members (e.g., "Q/W", "U/I", "U/I", "C/V" and "J/K", which might be represented, for example and without limitation, by key numbers, such as key #1, key #4, key #4, key #12 and key #9). In this example, the wireless handheld electronic device 4 responsively displays "QwUiUiCvJk" to represent the ambiguous input of those five example keys. Here, the first character, such as "Q", of a given key, such as "Q/W" is displayed as being uppercase ("Q") and the second character, such as "W", of that given key is displayed as being lowercase ("w").

Example 3

Referring to FIGS. 8A and 8B, the wireless handheld electronic device 4 of FIG. 1 renders a disambiguation result at the handheld electronic device output apparatus 12 responsive to an ambiguous input of, for example, five activations of four different input members (e.g., without limitation, "Q/W", "U/I", "U/I", "C/V" and "J/K") as in FIG. 7. However, here, the rendered disambiguation result (e.g., without limitation, "QUICK") is displayed at the output apparatus 12 as shown in FIG. 8A, before the search results from the server (e.g., without limitation, "Ben Quick", "Lucy Quick" and "Lisa Wiuck") are displayed at the output apparatus 12 as shown in FIG. 8B.

Example 4

In this example, there is a disambiguation algorithm employed at the wireless handheld electronic device 4, and the disambiguation is performed at the server 154 of FIG. 2 independent of that handheld electronic device disambiguation algorithm. For example, a first disambiguation algorithm is employed at the wireless handheld electronic device 4, and a second different disambiguation algorithm is employed at the server 154. As another example, the server 154 employs disambiguation on a global basis for all users, while the wireless handheld electronic device 4 employs disambiguation on a local basis for its sole user (or its limited set of users).

Example 5

As another example, relatively longer text strings than those containing two characters may be employed.

For example, a conventional typing of "T/Y-O/P-L O/P-O/P-E/R" at the wireless handheld electronic device 4 would conventionally provide relatively more difficulty for a GAL lookup, since the user must either use multi-tap or edit what is rendered by default. In this conventional case, if the rendered output by the handheld electronic device 4 is "TOL OPE", then this must be edited by deleting everything and retyping in order to achieve the desired explicit lookup of "YOL OPE" for the desired look up of "Yolanda Openheimer". Such editing is not needed with the disclosed handheld electronic device 4 and the disclosed server 154.

Example 6

As an alternative to Example 1, the wireless handheld electronic device 4 of FIG. 1 sends a unique identification (e.g., without limitation, the PIN of that device) to the server 154. Then, at 266 of FIG. 6, the routine 260 receives the input apparatus type, such as the above described keyboard layout/device type, the above described disambiguation type and the unique identification of the handheld electronic device, such as user information (user info). Next, at 268, the routine 260 performs a disambiguation to provided a rendered output based upon the received disambiguation type, the received number of activations of a number of the input members of the handheld electronic device input apparatus, the received input apparatus type, and the unique identification of the handheld electronic device. Here, the unique identification is employed since the server 154 "learns" a disambiguation history on a per user basis, as opposed to learning a disambiguation history on a global basis for all users. This learning function is local to the local user(s). Alternatively, the unique identification may be used to distinguish between handheld electronic devices employing different keyboards (e.g., without limitation, SureType™; T9; full QWERTY).

Example 7

As an alternative to Example 1, the handheld electronic device 4 employs a different disambiguation algorithm (e.g., T9; predictive text) including a corresponding disambiguation type (e.g., T9; predictive text) at such device, and sends the disambiguation type from such device to the server 154. At 266 of FIG. 6, the routine 260 receives the input apparatus type (e.g., T9; predictive text), the corresponding disambiguation type, and the corresponding unique identification of the device 4. This permits the server 154 to determine, for example, that the user typed the keys "T/Y", "SPACE" and "O/P" of the corresponding keyboard layout and that the device 4 employs the corresponding disambiguation on a per user basis. Finally, step 268 performs the disambiguation of the corresponding disambiguation type to provide the rendered output. This permits the disambiguation at the server 154 to be the same as or substantially similar to the disambiguation algorithm of the device 4.

Example 8

In this example, at step 210 of FIG. 3, a server, such as 154 of FIG. 2, determines as the number of possible combinations of the characters based upon the received input apparatus type and the received number of activations, all possible combinations of the characters. However, this example is generalized beyond GAL, such that any server (e.g., without limitation, a BlackBerry® Enterprise Server 4.1; any suitable enterprise server; any suitable server), that provides text matching services has knowledge of the keypad or text entry configuration of the remote computing client (e.g., without limitation, wireless handheld electronic device 4), in order to provide the most exhaustive set of search results.

As shown in FIG. 9, at 290, the server 154 receives the keys and the type of input apparatus. Next, at 292, the server 154 determines the characters from the type of input apparatus. Then, at 294, the server 154 determines all possible character combinations. Finally, at 296, the server 154 initiates a number of searches based upon all of those possible character combinations.

For example, if the user types "T/Y", "SPACE" and "O/P", then the server 154 is structured to provide search results for any and all combinations of "T P", "T O", "Y O" and "Y P". This would involve, for example, four different searches. As another non-limiting example, if the user types "E/R" and "L", then the server 154 is structured to provide search results for any and all combinations of "EL" and "RL" This would involve, for example, two different searches. As a further non-limiting example, if the user types "T/Y", "E/R", "SPACE" and "O/P", then the server 154 is structured to provide search results for any and all combinations of "TE" and "O", "TR" and "O", "YE" and "O", "YR" and "O", "TE"

and "P", "TR" and "P", "YE" and "P", and "YR" and "P". This would involve, for example, eight different searches.

Hence, the user can see all possible search results independent of any type of disambiguation. For example, this shows all contact search results regardless of the actual letters that any disambiguation software, local or server, might render. A key difference is that the service that is providing the data in the over the air GAL lookup has knowledge of the keypad or text entry configuration of the remote computing client, in order to provide the most complete search results to GAL or other suitable types of lookups or searches.

Example 9

The input apparatus 8 of FIG. 1 may be a keyboard having a sub-type, in which that keyboard is structured to be modified to provide a different sub-type. For example, slider keypads or flip keypads expose a second keypad (e.g., without limitation, Siemens SK65™; Sony EP910™) or touch screen that have a predetermined number of configurable touch keypads (e.g., without limitation, software renders the keypad for the user) (e.g., T9; QWERTY; SureType™) based on that user's preferences. As employed in this context, the term "modified" encompasses slid, flipped and/or other modifications of a keyboard to provide a different sub-type. In turn, at 222 of FIG. 4, the processor 16 of FIG. 1A is structured to send the different sub-type to the server 154 of FIG. 2. As shown at 300 of FIG. 10, the server 154 receives the number of activations (keys), the type of input apparatus, and the sub-type of the input apparatus. Then, at 302, the server 154 determines the number of possible combinations of the characters based upon the received input apparatus type, the received sub-type and the received number of activations.

Example 10

Figure 11:
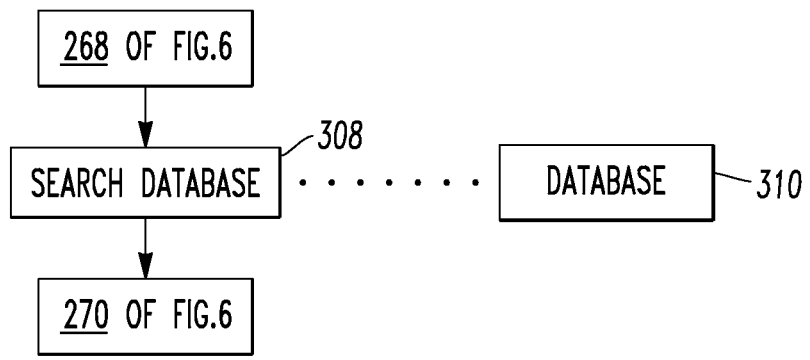

Referring to FIG. 11, the processor 155 of the server 154 is structured to search, at 308, for the number of search results in a database 310 based upon the rendered output from step 268 of FIG. 6. In turn, the count of those search results is employed by step 270 of FIG. 6 to determine if there is a GAL match.

Example 11

Figure 12:
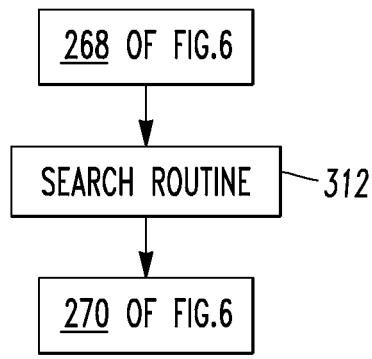

As shown in FIG. 12, the processor 155 of the server 154 employs a search routine 312 to search for the number of search results based upon the rendered output from step 268 of FIG. 6. In turn, the count of those search results is employed by step 270 of FIG. 6 to determine if there is a GAL match.

Example 12

Figure 13A:
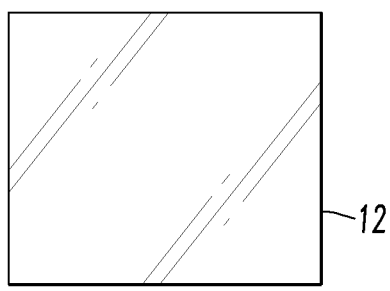
FIGS. 13A and 13B are display screens of the wireless handheld electronic device of FIG. 1 in accordance with another embodiment of the disclosed and claimed concept.
Figure 13B:
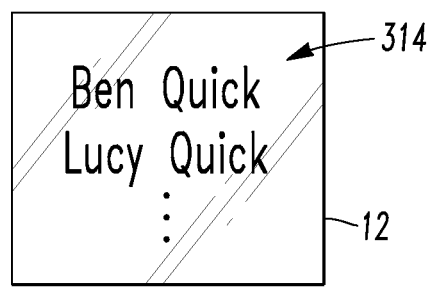

FIGS. 13A and 13B are relevant portions of display screens of the output apparatus 12 of the wireless handheld electronic device 4 of FIG. 1. In FIG. 13A, the display screen portion displays nothing at the handheld electronic device 4 responsive to the ambiguous input until after the server 154 of FIG. 2 provides the rendered output 314 of FIG. 13B. This could be, for example, a user preference in order to remove clutter or potential confusion from GAL searches.

Examples 13-20, below, pertain to different applications of the server 154 of FIG. 2.

Example 13

The server 154 provides a global address lookup (GAL) of a number of e-mail addresses as its search results, and provides such number of e-mail addresses to the handheld electronic device 4 of FIG. 1 responsive to the global address lookup.

Example 14

The server 154 provides text matching to lookup music in terms of a number of music titles as its search results, and provides such number of music titles to the handheld electronic device 4 responsive to the music lookup.

Example 15

The server 154 is an instant messaging (IM) server, which provides text matching to lookup users (e.g., without limitation, actual or fictitious user names) in terms of a number of users of the IM server as its search results, and provides such number of users to the handheld electronic device 4 responsive to the IM lookup.

Example 16

The server 154 is a user group server, which provides text matching to lookup members (e.g., without limitation, actual or fictitious names of members) in terms of a number of members of the user group as its search results, and provides such number of members of the user group to the handheld electronic device 4 responsive to the user group lookup.

Example 17

The server 154 is a social networking (e.g., without limitation, Facebook®) server, which provides text matching to lookup friends (e.g., without limitation, actual or fictitious names of friends or other persons) in terms of a number of friends or other persons as its search results, and provides such number of friends or other persons to the handheld electronic device 4 responsive to the social networking lookup.

Example 18

The server 154 is a web server including a web page (not shown) having a drop down menu (not shown). The handheld electronic device 4 is a client of the web server, which receives a number of activations of the input members 28 (e.g., without limitation, keys) from the drop down menu on the web page. Although this example contemplates entering data from drop down menus on web pages, any suitable data entry mechanism may be employed. The user entered data in the data entry mechanism may, optionally, be disambiguated by the handheld electronic device 4 before selecting or otherwise inputting, for example and without limitation, "GO".

As a more specific example, if the user browses to a web page and activates a drop down menu, in order to select local movie listings, then the following example movies are dropped down:
 1. Animal Louse
 2. Something About Marty
 3. Casavermelho
 4. The Gooder, The Badder, and the Just Plain Ugly
 5. Yo Momma As is the typical function of drop down menus, the first letter is only searched, and serially so. That is to say, if a user typed "A/S", the first time it would highlight item 1, the second time it would highlight item 2, and the third time back to item 1. Should, however, the user type "C/V", then only item 3 would ever be highlighted. Similarly, typing "T/Y" would cycle the selection between items 4 and 5.

Example 19

The server 154 is a search engine (e.g., without limitation, Google®) web server including a web page (not shown) having an entry field (not shown). The handheld electronic device 4 is a client of the search engine web server, which receives a number of activations of the input members 28 (e.g., without limitation, keys) from the entry field on the web page.

It is important to note that the handheld electronic device type may be received at the search engine via an industry standard UAPROF header (user agent profile). Currently, many web sites (such as Google®) use this mechanism to detect handheld device details, such as the fact that it is a wireless device, the brand, and even the browser emulation mode and the screen size (e.g., to limit data costs over the air; to render according to the display capabilities of the particular device).

Although this example contemplates entering data from an entry field on web pages, any suitable data entry mechanism may be employed. The user entered data in the data entry mechanism may, optionally, be disambiguated by the handheld electronic device 4 before, or in addition to, selecting or otherwise inputting, for example and without limitation, "GO" or "SEARCH".

Further, the search engine may accept the input of a particular search rendered un-ambiguously (e.g., Q/w U/i U/i C/v J/k) and after the user selects "GO" or "SEARCH" will present the user with a number of text choices to disambiguate the search, such as "Did you mean to search 'Quick' or 'Wiuck'". Additionally, for example, a "I'm Feeling Lucky" button function would automatically allow the web search service to guess the user's intended input in addition to jumping to the most likely web site being searched.

Example 20

The server 154 includes a search routine (e.g., 312 of FIG. 12) and is structured to perform a disambiguation at such server of the number of possible combinations of the characters to provide the rendered output at step 268 of FIG. 6. The search routine 312, in turn, employs the rendered output as the function of the number of possible combinations of the characters.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of providing a number of search results for a handheld electronic device, the method comprising:
receiving an input layout type of the handheld device at a server, wherein the input layout including a plurality of input keys, each of at least one portion of the input keys having a plurality of characters assigned thereto;
receiving a number of selections of a number of the input keys of the input layout at the server;
determining, at the server, a number of possible combinations of the characters based upon the received input layout type and the received number of selections;
disambiguating at the server the number of possible combinations of the characters using an algorithm to provide a rendered output, wherein the disambiguating at the server is a function of a disambiguation type at the handheld electronic device so that the disambiguation algorithm at the server is the same or substantially similar to a disambiguation algorithm of the handheld electronic device;
searching for a number of search results based on the rendered output; and
sending the number of search results from the server to the handheld electronic device.

2. The method of claim 1, further comprising:
searching for the number of search results in a database based upon the rendered output.

3. The method of claim 1, further comprising:
providing the disambiguation at the server responsive to an ambiguous input of a count of selections of a number of the input keys at least one portion of the number of the input keys of the ambiguous input including a plurality of characters assigned thereto; and
providing at the server the rendered output having a count of characters that is equal or substantially equal to the count of selections of the number of the input keys of the ambiguous input.

4. The method of claim 3, further comprising:
using as the plurality of characters, a first character and a second character; and
for each of the at least one portion of the number of the input keys of the ambiguous input including the plurality of characters assigned thereto, and responsive to the ambiguous input, displaying at the handheld electronic device the first character as being uppercase and the second character as being lowercase.

5. The method of claim 3, further comprising:
rendering a disambiguation result at the handheld electronic device responsive to the ambiguous input, before displaying the rendered disambiguation result at the handheld electronic device and before displaying the at least one portion of the number of search results at the handheld electronic device.

6. The method of claim 3, further comprising:
displaying nothing at the handheld electronic device responsive to the ambiguous input until after the server provides the rendered output.

7. The method of claim 1, further comprising:
rendering disambiguation results from the disambiguation algorithm at the handheld electronic device;
performing the disambiguation algorithm at the server independent of the disambiguation algorithm of the handheld electronic device; and
sending the rendered disambiguation results at the handheld device to the server.

8. The method of claim 1, further comprising:
sending a unique identification of the handheld electronic device to the server;
receiving the unique identification at the server; and
performing the disambiguation at the server as a function of the unique identification.

9. The method of claim 1, further comprising:
using as the input layout a keyboard having a sub-type;
modifying the keyboard to provide a different sub-type;
sending the different sub-type from the handheld electronic device to the server;

receiving the different keyboard sub-type at the server; and
determining at the server the number of possible combinations of the characters based upon the received input layout type, the received different keyboard sub-type and the received number of selections.

10. The method of claim 1, further comprising:
providing, as the number of search results, a number of e-mail addresses responsive to a global address lookup.

11. The method of claim 1, further comprising:
providing, as the number of search results, a number of music titles responsive to a music lookup.

12. The method of claim 1, further comprising:
providing, as the number of search results, a number of users of an instant messaging server, wherein the instant messaging server is the server.

13. The method of claim 1, further comprising:
providing, as the number of search results, a number of keys of a user group.

14. The method of claim 1, further comprising:
providing, as the number of search results, a number of names of persons from a social networking server, wherein the social networking server is the server.

15. The method of claim 1, further comprising:
using as the server a web server including a web page having a drop down menu; and
receiving the number of selections at the server from the drop down menu on the web page.

16. The method of claim 1, further comprising:
using as the server a search engine server including a web page having an entry field; and
receiving the number of selections at the server from the entry field on the web page.

17. A system comprising:
a handheld electronic device comprising:
  a processor,
  a wireless transceiver,
  a display apparatus, and
  an input layout including an input layout type and a plurality of input keys, each of at least one portion of the input keys having a plurality of characters assigned thereto;
a server comprising a processor; and
a wireless communication network between the wireless transceiver of the handheld electronic device and the processor of the server,
wherein the processor of the handheld electronic device is configured to send the input layout type to the server, receive a number of selections of a number of the input keys of the input layout, and send the received number of selections to the server,
wherein the processor of the server is configured to:
  receive the input layout type,
  receive the number of selections,
  determine a number of possible combinations of the characters based upon the received input layout type and the received number of selections,
  disambiguate the number of possible combinations of the characters using an algorithm to provide a rendered output,
  search for a number of search results based on the rendered output, and
  send the number of search results to the handheld electronic device,
wherein the disambiguating at the server is a function of a disambiguation type at the handheld electronic device so that the disambiguation algorithm at the server is the same or substantially similar to a disambiguation algorithm of the handheld electronic device, and
wherein the processor of the handheld electronic device is further configured to receive the number of search results, and display at least a portion of the number of search results at the display apparatus.

18. A handheld electronic device for use with a server configured to:
receive an input layout type,
receive a number of selections of a number of input keys of the input layout,
determine a number of possible combinations of characters based upon the received input layout type and the received number of selections,
disambiguate the number of possible combinations of the characters using an algorithm to provide a rendered output,
search for a number of search results based on the rendered output, and
send the number of search results to the handheld electronic device,
wherein disambiguating at the server is a function of a disambiguation type at the handheld electronic device so that the disambiguation algorithm at the server is the same or substantially similar to a disambiguation algorithm of the handheld electronic device, the handheld electronic device comprising:
a wireless transceiver;
a display apparatus;
the input layout including the input layout type and the plurality of the input keys, each of the at least one portion of the input keys having the plurality of characters assigned thereto; and
a processor configured to:
  send the input layout type from the handheld electronic device to the server,
  receive the number of selections of the number of the input keys of the input layout,
  send the received number of selections to the server,
  receive the number of search results, and
  display at least a portion of the number of search results at the display apparatus.

19. The handheld electronic device of claim 18, wherein the input layout is a keyboard having a sub-type, the keyboard being configured to be modified to provide a different sub-type, and wherein the processor is further configured to send the different sub-type to the server, such that the server receives the different sub-type and determines the number of possible combinations of the characters based upon the received input layout type, the received different sub-type and the received number of selections.

* * * * *